United States Patent [19]

Van Voorthuijsen

[11] Patent Number: 5,051,006
[45] Date of Patent: Sep. 24, 1991

[54] ROLLER BEARING CAGE

[75] Inventor: Joop Van Voorthuijsen, Ochten, Netherlands

[73] Assignee: AB SKF, Gothenburg, Sweden

[21] Appl. No.: 423,884

[22] Filed: Oct. 19, 1989

[30] Foreign Application Priority Data

Nov. 14, 1988 [SE] Sweden ............................. 8804095

[51] Int. Cl.⁵ .......................................... F16C 33/46
[52] U.S. Cl. ................................. 384/574; 384/572
[58] Field of Search ............... 384/572, 574, 575, 576, 384/580, 565, 567, 623

[56] References Cited

U.S. PATENT DOCUMENTS

| | | | |
|---|---|---|---|
| 3,586,407 | 6/1971 | Schweitzer | 384/574 |
| 4,154,491 | 5/1979 | Derner et al. | 384/572 |
| 4,684,268 | 8/1987 | Sahlgren et al. | 384/574 |
| 4,710,039 | 12/1987 | Huttner | 384/574 |
| 4,812,058 | 3/1989 | Hofmann et al. | 384/576 X |

Primary Examiner—Daniel P. Stodola
Assistant Examiner—William G. Battista, Jr.
Attorney, Agent, or Firm—Eugene E. Renz, Jr.

[57] ABSTRACT

A cage for the rollers in a roller bearing has two annular portions (11, 12) and intermediate bars (13). A protrusion (16) is provided on the side surface (15) of the one annular members (11) in connection to each cage pocket (14) for insertion into a recess in the adjacent roller end so as to retain the roller (10) in the cage pocket (14).

7 Claims, 2 Drawing Sheets

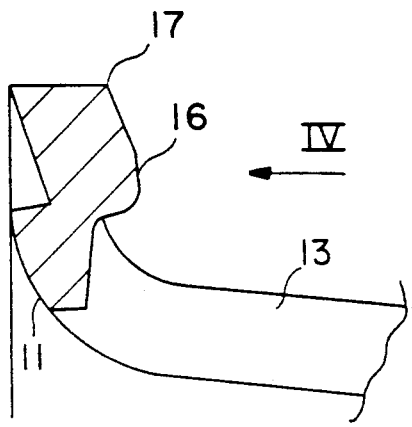
FIG. 3
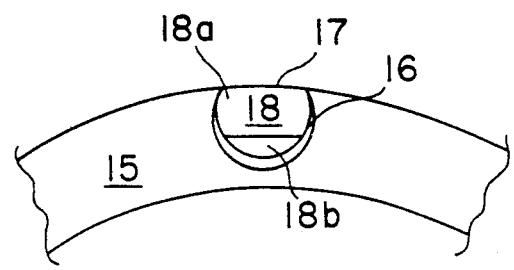
FIG. 4
FIG. 5
PRIOR ART
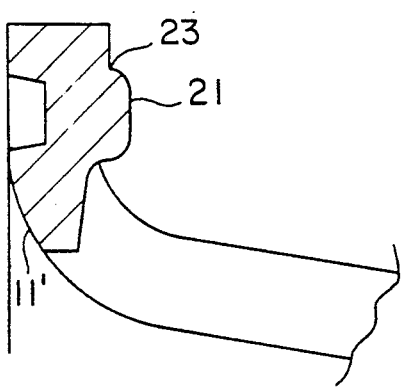
FIG. 6
PRIOR ART
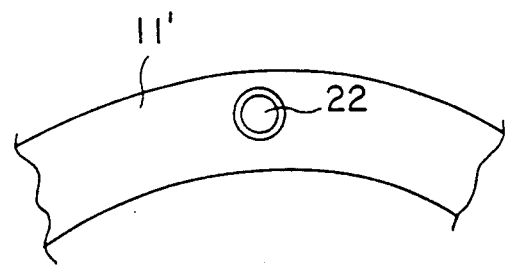

ROLLER BEARING CAGE

BACKGROUND OF THE INVENTION

A roller bearing cage of the general type to which the present invention relates is disclosed in U.S. Pat. No. 4,684,268. In this prior art cage, the protrusions are located inwardly of and spaced from the periphery of the side face. This means that the wear resistibility of the protrusions is rather limited and that the protrusions, due to their comparatively small dimensions, are rather sensitive to the type of burring used in the burring operation required after forming the cage by pressing. There is a risk that the die used during pressing of the protrusions becomes filled with oil and/or impurities, which negatively affects the tolerances of the dimensions of the protrusions. The protrusions are located comparatively far from the axis of the rollers, which negatively affects the capability of the protrusions to retain the rollers, and which requires a comparatively large recess for the protrusions in the rollers. Cages of this type can be made by pressing and stamping of sheet metal blanks.

SUMMARY OF THE INVENTION

The object of the present invention is to provide a roller bearing cage which is characterized by novel features of construction and arrangement to effectively overcome the above-mentioned disadvantages of the prior art.

To this end, the cage includes protrusions extending in a direction away from the cross bars defining the pockets to a point substantially aligned with the outer periphery of the side faces of the annular members of the cage.

BRIEF DESCRIPTION OF THE DRAWINGS

The invention is described in detail in the following with reference to the accompany drawings, in which:

FIG. 3 shows on an enlarged scale the encircled portion of the cage in FIG. 1 denoted by III;

FIG. 4 shows a view of a portion of the cage according to reference IV in FIG. 3; and FIGS. 5 and 6 show portions of a prior art cage corresponding to those in FIGS. 3 and 4.

DETAILED DESCRIPTION OF THE PREFERRED EMBODIMENT

Figure 1:
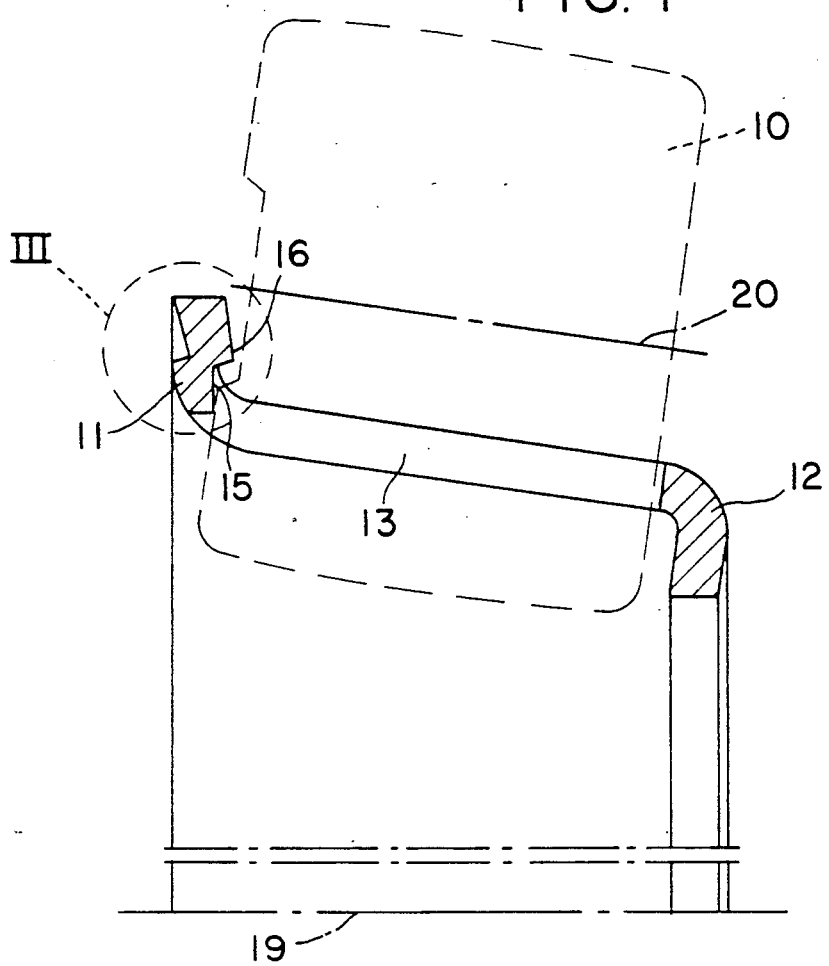
FIG. 1 shows an axial section of a portion of a cage according to one embodiment of the invention.
Figure 2:
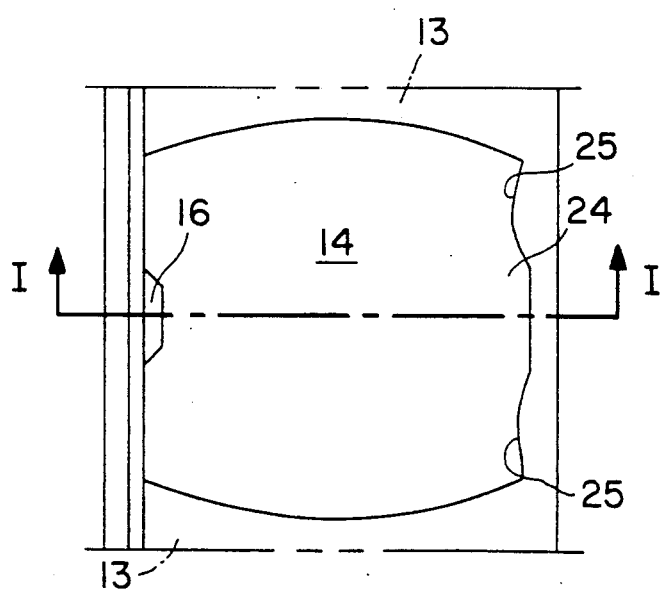
FIG. 2 shows a view from the outside and radially inward of a portion of the outer circumference of the cage, wherein section I—I corresponding to FIG. 1 is indicated.

The cage shown in FIGS. 1-4 is particularly intended to be used in a double row spherical roller bearing but can be used also in other types of roller bearings. In FIG. 1 a roller 10 for a double row spherical roller bearing is outlined and placed in its proper position in the cage. The axis 20 of the roller 10 forms an angle with the central axis 19 of the cage, whereby the axis of the rollers mounted in the cage define a cone with its apex on the axis 19, which coincides with the axis of the bearing. The cage comprises two closed annular portions 11, 12 and a plurality of bars 13 defining cage pockets 14. The bars 13 extend mainly parallel to the axis 20 of adjacent rollers and are situated between the axis 19 of the cage and the axis 20 of the rollers. Thereby the bars 13 occupy a minimum of space between the rollers 10, and the contact against the envelope surfaces of the rollers has a great radial force component with respect to the cage, so that the cage is firmly centered in the bearing by its contact with the rollers. A flange 11 forming an integrated portion of the annular portion is arranged at one end of the cage and extends outwardly from the center of the cage. Thereby the flange 11 does not significantly limit the space between the rows of rollers in a double row spherical roller bearing. The side surface 15 of the flange 11 which is facing the pockets 14 can be dimensioned to contact the rollers mounted in the cage on their end surfaces facing the flange and the side surface preferably has the shape of a torus. Further contact at side surface 15 also produces contact at the opposite end face of roller 10 and convex edges 25. The flange 11 preferably extends substantially as far radially outward that the extension of the roller axis 20 intersects the flanges surface which contacts the rollers, whereby maximum roller guiding ability is achieved.

Since the cage bars 13 are situated radially inside the roller axis 20 with respect to the cage axis 19 and thereby do not limit the radially outward mobility of the rollers, the cage functions to retain the rollers in the cage even when they are not enclosed in an outer ring. The embodiment disclosed in U.S. Pat. No. 4,684,268 and shown in FIGS. 5 and 6 comprises protrusions 21 on the flange $11^1$ extending towards the roller pockets and having a surface 22 facing the pockets. Each protrusion is situated so as to face the middle of each pocket. The protrusion is intended for insertion in a recess in the end surface of a roller situated in the opposing pocket, whereby the shape of the protrusion allows the roller to be snapped into position in the pocket by pressing the end surface of the roller radially inward part the protrusion 21, which procedure is possible because of the resiliency of the cage.

As shown is FIG. 6 the surface 22 is located completely radially inwardly of the periphery of the flange $11^1$ in the prior art cage. This means that the diameter of the circular pin used of pressing the protrusions 21 during the forming thereof, i.e. the punch, is small. Thus, the pin might be broken or plasticized after a number of impressions. Since a press die having a closed recess must be used during the pressing operation there is a risk that this small recess is filled with oil and/or impurities, which affects the shape of the protrusions, i.e. makes it difficult to maintain the tolerances of the dimensions of the protrusions unchanged. This means that the recess must be continuously cleaned, for instance by compressed air. Further, due to their limited dimensions the wear resistibility of the protrusions 21 is rather low. The limited dimensions also make the protrusions sensitive to the type of deburring used after the pressing operation which means that highly material-removing methods such as chemical deburring cannot be used. The protrusions 21 must also be located rather far from the axis 20 of the rollers which negatively affects the capability of the protrusions to retain the rollers. Such a location far from the roller axis also requires a large recess in the rollers for the protrusions, which is a disadvantage from a manufacturing point of view.

According to the invention the protrusions 16 on the side surface 15 are arranged to extend in a direction away from the bars 13 substantially all the way to the radially outer periphery 17 of the side surface 15. This is obtained by positioning the whole or substantially the whole pressing surface of the punch, i.e. the circular pin, against the flange 11, whereupon the radially outer portion of the flange is cut off so as to obtain a smooth peripheral edge 17. In a preferred embodiment the surface 18 on the protrusions 16 comprises 55-90% of the surface of the corresponding circle, said surface 18 having substantially the shape of a segment of a circle.

A protrusion produced according to the invention can be made thicker and thus become considerably more resistant to wear than the prior art protrusion shown in FIGS. 5 and 6, and be more reliable functionally. Further, the life of the punch becomes longer. Due to the fact that the recess in the press die is comparatively large, impurities and/or oil collected in this recess do not significantly affect the dimensions of the protrusions which make it comparatively easy to maintain the tolerances thereof unchanged. It is also possible to locate protrusions according to the invention closer to the axis of the rollers which improved the capability of the protrusions to retain the rollers in their pockets and requires only a small recess for the protrusion in the roller end surface.

In the preferred embodiment the surface 18 of the protrusions 16 coincides with the side surface 15 at the periphery 17. This means that the transition denoted by 23 in FIG. 5 between the side surface 15 and the surface 18 is completely eliminated. As shown in FIG. 3 the distance between the surface 18 and the side surface 15 increases successively in a direction away from periphery 17.

Further, in the preferred embodiment, the surface 18 is provided with two surface portions 18a, 18b of which the radially inner surface portion 18b is planar and parallel to the outer surface of the flange 11 and forms a smaller angle with the side surfaces 15 than the radially outer surface portion 18a. Alternatively, instead of being generally convex as shown in FIG. 3 the surface 18 might be generally concave when seen in an radial direction.

In order to ensure that the roller takes the correct position in relation to the pocket and the protrusion 16 during the snap action, recesses 24 are in a manner known per se provided at the opposite side of the cage in relation to the flange 11 in the annular portion 12. The recesses oppose the protrusions 16. Therewith the end portion of each roller can be directed correctly with respect to the protrusion 16 by being placed in the recess. The existence of the recess also allows the roller to be axially displaced from the protrusion 16 in the initial stage of the snapping procedure, which simplifies mounting. The envalope surfaces of the rollers are not subjected to any pressure during the mounting procedure, which diminshes the risk for roller damages. A convex edge 25 is suitably provided on either side of recess 24, which edge extends towards the interior of the pocket. This arrangement prevents the edges of the roller from contacting the cage when the rollers are skewed, thereby diminishing wear in the bearing.

Also the flange has suitably a convex surface facing the rollers. The surface has the shape of a torus in order to give a suitable contact against the adjacent roller ends. A flange is preferably arranged also in connection to the annular portion 12. Such a flange gives the cage an increased stability and strength. If the flange extends inwardly, the whole cage may be formed in a simple manner in a pressing and punching tool.

The cage in a double row spherical roller bearing is preferably supplemented with a loose guide ring, not shown which enclosed the flange 11 of the cages of both rows of rollers. FIG. 1 shows the cage of one row of rollers only. The guide ring cooperates with the cage in guiding the rollers.

If a roller in the loaded zone in the bearing has a tendency to skew it will be guided by the contact with the guide ring. At the same time, the guide ring will be displaced toward the loaded zone of the bearing by being squeezed into a wedge shaped space between the ends of the rollers of both of rollers. Therewith the guide ring displaces the cage radially towards the loaded zone of the bearing due to its contact with the cage in the unloaded zone so that the play of the rollers in the cage pockets in the loaded zone decreases, whereby the guidance of the rollers is further improved.

What is claimed is:

1. A cage for a row of rollers (10) in a roller bearing comprising first and second closed annular portions (11,12) and a plurality of bars (13) extending therebetween, said bars defining cage pockets (14), wherein the first annular portion (11) has a side face (15) facing the rollers (10) and wherein at least one protrusion (16) is provided on said side face (15) adjacent a cage pocket, said protrusion extending generally toward the second annular portion (12), and having faces (18a, 18b) inclined relative to said side face (15) characterized in that the protrusion (16) extends in a direction away from the bars (13) substantially as far as to the radially outer periphery (17) of said side face (15) whereby at least one of the faces (18a) is farther from commonality with said side face (15) in a direction radially inwardly from said periphery (17).

2. A roller cage according to claim 1, wherein one of said faces (18b) forms a smaller angle with said side face (15) of said first annular portion (11) than the other face (18a).

3. A roller cage according to claim 1, wherein said face (18a, 18b) facing the rollers (10) is generally concave as viewed in a radial direction.

4. A roller cage according to claim 1, wherein said face (18a, 18b) facing the rollers (10) has substantially the shape of a segment of a circle.

5. A roller cage according to claim 4, wherein said segment of said circle comprises a substantial portion of said circle, preferably 55-90% of said circle.

6. A roller cage according to claim 1, wherein the bars (13) extend substantially parallel to the axis of adjacent rollers (10) and are located between the axis (19) of the roller bearing and the axis (20) of the rollers.

7. A cage for a row of rollers (10) in a roller bearing comprising first and second closed annular portions (11,12) and a plurality of bars (13) extending therebetween, said bars defining cage pockets (14), wherein the first annular portion (11) has a side face (15) facing the rollers (10) and wherein at least one protrusion (16) is provided on said side face (15) adjacent a cage pocket, said protrusion extending generally toward the second annular portion (12), and having at least one face (18) inclined relative to said side face (15), characterized in that the protrusion (16) extends in a direction away from the bars (13) substantially as far as to the radially outer periphery (17) of said side face (15) whereby said face (18) is farther from commonality with said side face (15) in a direction radially inwardly from said periphery (17).

* * * * *